No. 694,540. Patented Mar. 4, 1902.
A. D. & G. L. FRANCOEUR.
GRAIN CLEANER.
(Application filed Mar. 11, 1901.)
(No Model.) 3 Sheets—Sheet 1.
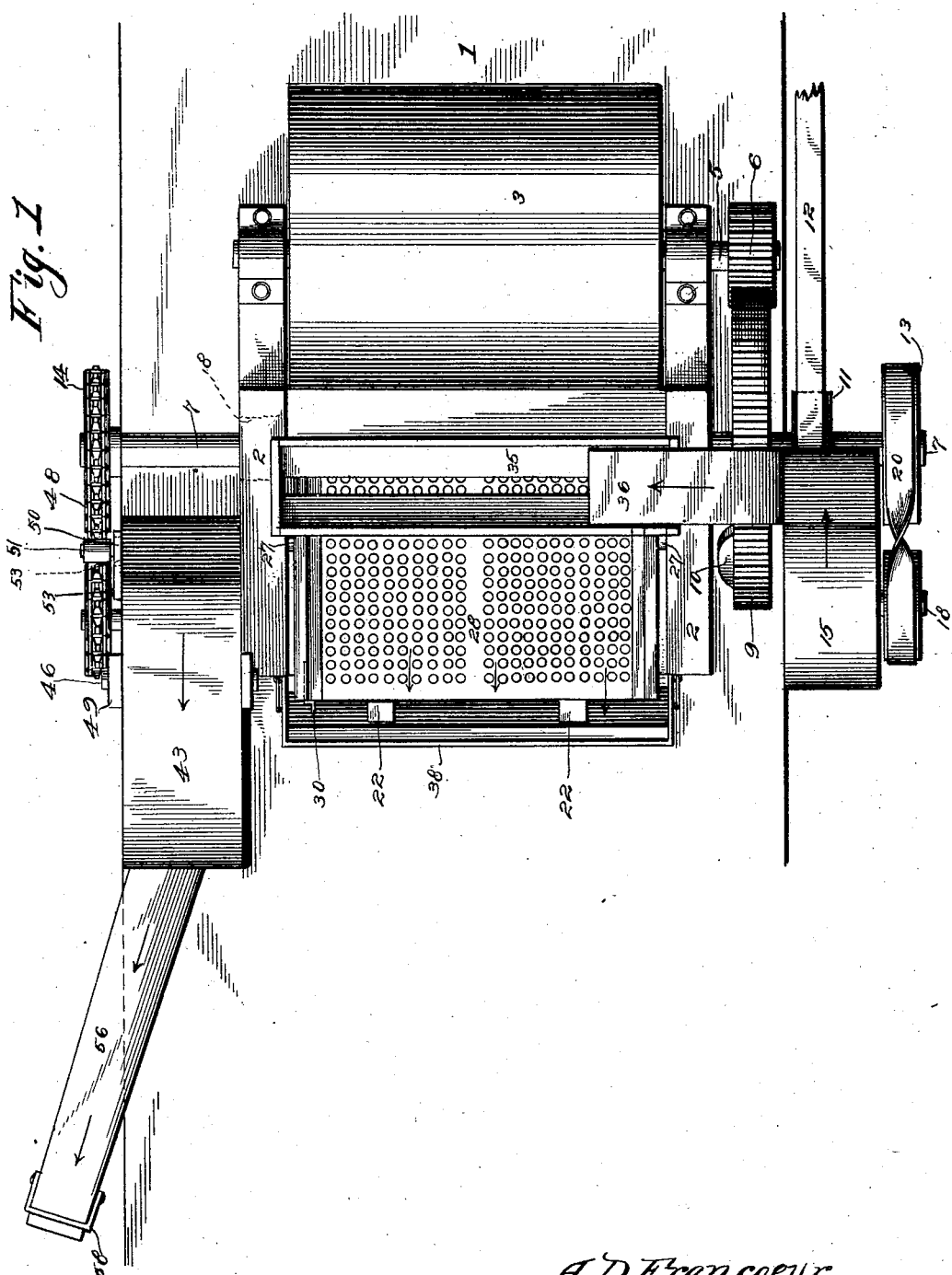

No. 694,540. Patented Mar. 4, 1902.
A. D. & G. L. FRANCOEUR.
GRAIN CLEANER.
(Application filed Mar. 11, 1901.)
(No Model.) 3 Sheets—Sheet 2.
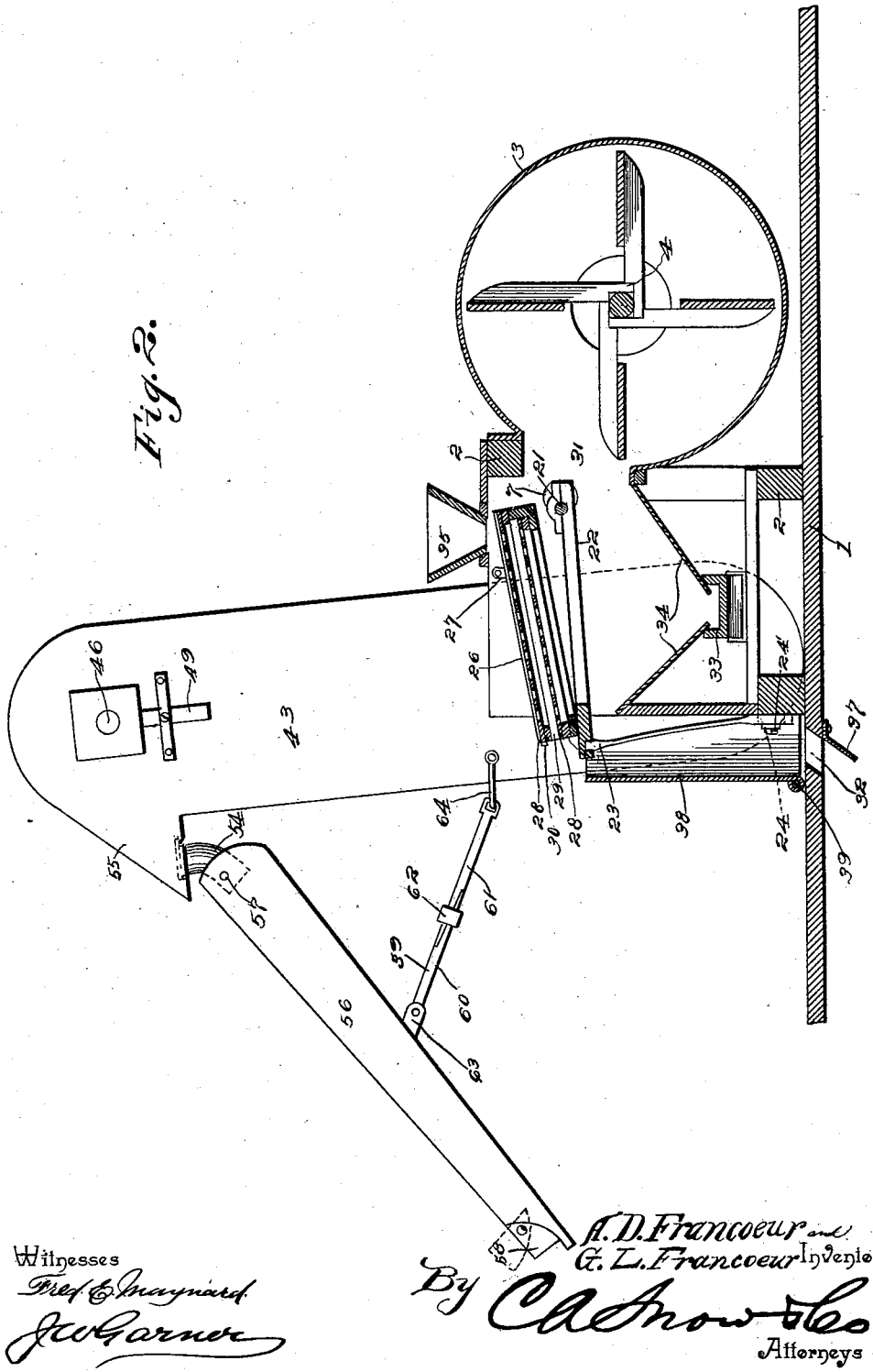

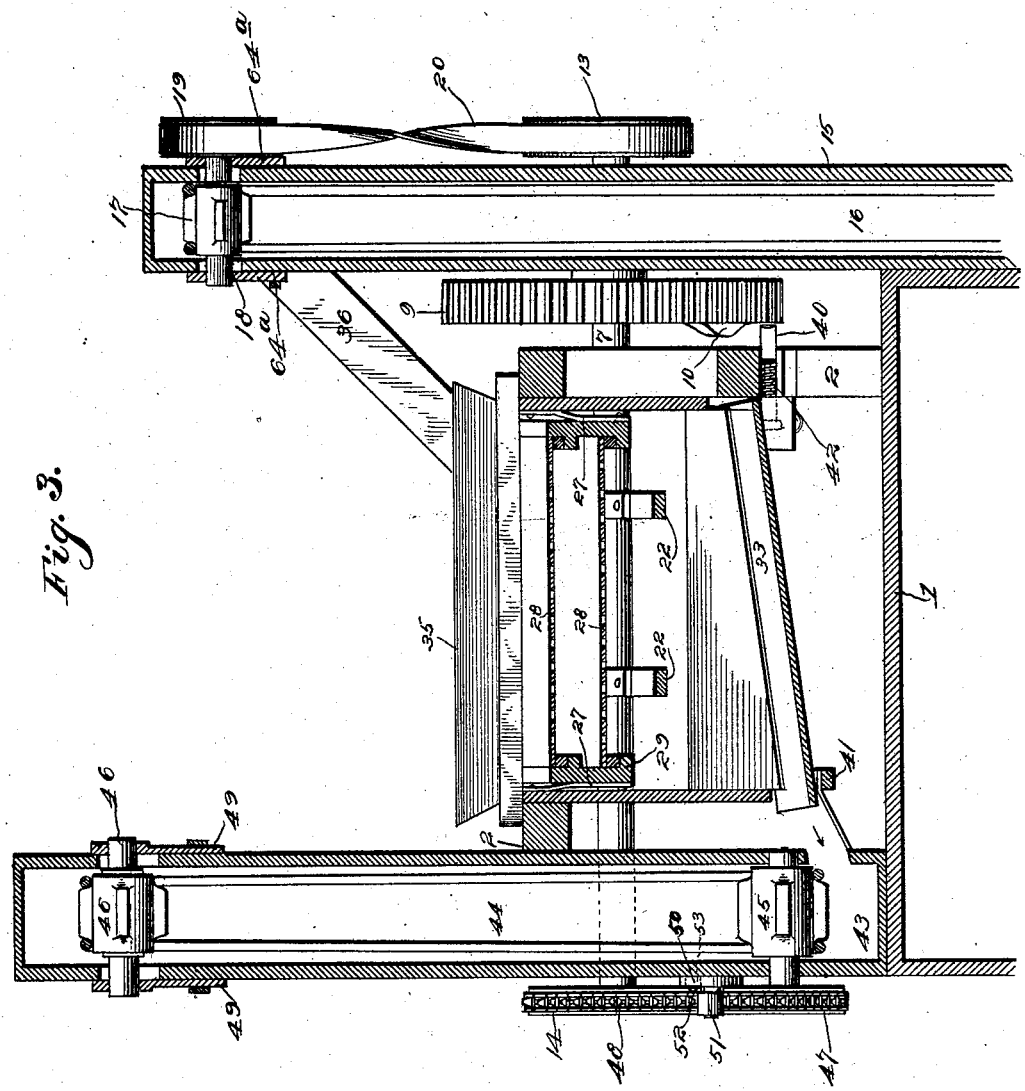

UNITED STATES PATENT OFFICE.

ADOLPHIS D. FRANCOEUR AND GEORGE L. FRANCOEUR, OF CONCORDIA, KANSAS.

GRAIN-CLEANER.

SPECIFICATION forming part of Letters Patent No. 694,540, dated March 4, 1902.

Application filed March 11, 1901. Serial No. 50,698. (No model.)

*To all whom it may concern:*

Be it known that we, ADOLPHIS D. FRANCOEUR and GEORGE L. FRANCOEUR, citizens of the United States, residing at Concordia, in the county of Cloud and State of Kansas, have invented a new and useful Grain-Cleaner, of which the following is a specification.

Our invention is an improved grain-cleaner, especially adapted to be secured on, operated by and in connection with a threshing-machine, for the purpose of cleaning the grain as the same is threshed by the threshing-machine, and it consists in the peculiar construction and combination of devices hereinafter fully set forth and claimed.

In the accompanying drawings, Figure 1 is a top plan view of a grain-cleaner constructed in accordance with our invention, showing the same in operative position on the upper side of the casing of a threshing-machine. Fig. 2 is a vertical sectional view of the same, taken on a plane indicated by the line $a\ a$ of Fig. 1. Fig. 3 is a vertical transverse sectional view of the same, taken on a plane indicated by the line $b\ b$ of Fig. 1.

The top 1 of the casing of a threshing-machine forms the supporting-bed for our improved grain-cleaner. A suitable frame 2 is secured on the top of a threshing-machine casing, and on one side of the said frame is secured a fan-casing 3, in which is a revoluble fan or blower 4, the shaft 5 of which is provided at one end with a gear-pinion 6.

A shaft 7, which is the main shaft of our improved grain-cleaner, is journaled in suitable bearings 8, with which the frame 2 is provided. Said shaft 7 has a spur-gear 9, which is engaged by the pinion 6, and is provided on its inner side with a cam 10. The said shaft 7 is further provided with a pulley 11, which receives power from a suitable pulley on a counter-shaft (not shown) of the threshing-machine by a belt 12 of the usual construction. Said shaft 7 is further provided at one end with a pulley 13 and at the opposite end has a sprocket-wheel 14.

The trunk 15 of an elevator leads from the feed-worm of the threshing-machine, the said trunk being disposed in a vertical position on one side of the elevator-casing, secured thereto, and extending a suitable distance above the same. In the said trunk 15 is a suitable endless traveling elevating element 16, which is supported in the upper end of the trunk and operated by a roller 17, the shaft of which has its bearings in the sides of the said trunk, as at 18. The said roller-shaft has at its outer end a pulley 19, which is connected to the pulley 13 on the main shaft 7 by an endless belt 20.

The shaft 7 is provided with eccentrics 21 which are engaged by shaking-bars 22, the outer ends of the said shaking-bars being supported by spring-standards 23. The said spring-standards have adjusting-slots 24 in their lower portions and are secured to the frame 2 on one side of the latter by set screws or bolts 24, which pass through the said adjusting-slots, and thereby enable the said spring-standards to be adjusted vertically in order to dispose the shaking-bars 22 at any desired inclination. A riddle-frame 26 has its inner sides supported by swinging straps 27, the upper ends of which are pivotally connected to the frame 2 and the lower ends of which are pivotally connected to the said riddle-frame. The lower side of the latter rests upon the shaking-bars 22 and is supported in an inclined position thereby. Hence by adjusting the spring-standards 23 by the means hereinbefore described the riddle-frame, and consequently the riddles carried thereby, may be supported at any desired inclination. The riddles 28 are removable from the riddle-frame, are supported on ledges 29 in the ends of the riddle-frame, and are secured in place by spring-catches 30 at the ends of the riddle-frame. The grain-cleaner is provided with a series of these riddles of different-sized meshes to adapt the machine for cleaning various kinds of grain.

It will be observed by reference to Fig. 2 that the riddle-frame is opposite the discharge-opening 31 of the fan or blower casing and it will be understood that the blast from the fan or blower passes under and through the riddles in the riddle-frame. It will be furthermore understood that the shaft 7 by its rotation imparts lateral reciprocating motion to the riddle-frame by means of the eccentrics 21, the shaking-bars 22, and the spring-standards 23. Hence the riddles are vibrated, and this vibration thereof, together with the inclined position thereof, causes the chaff to be discharged over the lower sides of the riddles and to fall through an opening 32 in the top of the threshing-machine casing. The grain discharged through the riddles falls onto a trough 33. Inclined boards 34, which form a hopper, feed the grain as it drops from the riddles to the said trough. A hopper 35 is secured on the frame 2 and is disposed above and discharges onto the upper side of the upper riddle. A discharge-trough 36, which leads from the upper end of the elevator-trunk 15, discharges into the said hopper. Hence the threshed grain is discharged from the threshing-machine by the feed-worm to the elevator and is by the latter delivered to the hopper 35, from whence, as before stated, the grain falls onto the riddles.

A deflector 37 is placed below and on the front side of the opening 32, through which the chaff falls, to prevent the blast from the blast-fan in the threshing-machine from passing upward through said opening 32. A shield 38 is disposed in rear of the frame 2, in rear of said opening 32, and is hinged at its lower side to the top of the threshing-machine casing, as at 39, the said shield preventing the blast from the fan 4 from carrying away the chaff discharged over the riddles, the chaff being caused by the shield to drop through the opening 32 into the interior of the casing, from which it is discharged together with the threshed straw.

The trough 33, which is inclined as shown in Fig. 3, is supported at one end by a guide-pin 40, which operates in a suitable opening in one side of the frame 2 and has its outer end disposed in the path of the cam 10, carried by the wheel 9. The lower end of the said trough rests on a suitable support 41. A spring 42 presses the said trough outward and disposes the guide-pin 40 thereof in the path of said cam 10. Hence the said cam, pin, and spring coöperate to impart reciprocating motion to the said trough 33 when the machine is in operation and the shaft 7 is in revolution. The said trough 33 discharges the cleaned grain into the lower end of an elevating-trunk 43, in which is a discharge-elevator comprising an endless traveling elevating element and the rollers 45 46, which support and operate the same. The shaft of the lower roller 45 has a sprocket-wheel 47, which is connected to the sprocket-wheel 14 by an endless sprocket-chain 48. Thereby power is conveyed from the main shaft 7 to the discharge-elevator. The upper roller 46 of the discharge-elevator is journaled in vertically-adjustable bearings 49 on the outer sides of the elevator-trunk 43. Thereby the endless traveling elevating element 44 may be kept at the requisite tension. The tension of the endless sprocket-chain 48 is regulated by an arm 50, which carries an antifriction-roller 51, that bears on the upper lead of said chain, the said arm being secured on one side of the trunk 43 by an adjusting screw or bolt 52, which passes through an adjusting-slot 53 in the said arm. A tubular elbow 54 has its upper end swiveled or otherwise suitably pivotally connected to the discharge-spout 55 of the discharge-elevator. To the lower portion of the said tubular elbow is pivotally connected the upper end of a discharge-spout 56, as at 57. Said discharge-spout 56 has a pivoted gate or cut-off 58 at its lower end. Said discharge-spout 56 is supported at any suitable inclination by a bar 59, which is composed of the sections 60 61, the inner ends of which are connected together by a clip 62 and overlap each other, as shown. Thereby the said bar may be longitudinally adjusted. Said bar has its upper end pivotally connected to the discharge-trough 56, as at 63, and its lower end pivotally connected and adapted to slide on a traveler 64, which is semicircular in shape, and thereby adapts the said discharge-spout 56, together with its supporting-bar, to be swung laterally in any desired direction. The said spout 56 discharges the grain, after the same has been cleaned, into a wagon or any suitable receptacle.

The roller 17 of the elevating element 16 is journaled in adjustable bearings 64$^a$, which are similar to the adjustable bearings 49. Thereby the endless traveling element may be kept at the requisite tension.

Having thus described our invention, we claim—

1. In combination with an elevator to convey threshed grain from a threshing-machine, a frame on the threshing-machine casing, a riddle to which the threshed grain is fed by the elevator, a power-shaft in said frame, connections between said power-shaft and said riddle, to operate the latter, connections between said power-shaft and said elevator, whereby the latter is operated, a gear-wheel on said power-shaft, said gear-wheel having a cam on one side thereof, a blower on one side of said frame, said blower having a pinion engaging said gear-wheel, and a shaking grain-discharge trough under said riddle-frame and operated by the cam of said gear, substantially as described.

2. A threshing-machine casing having an opening in its upper side, in combination with a recleaning mechanism and an elevator to convey threshed grain to said recleaning mechanism, the latter including a riddle, a hopper below the riddle, to catch the grain that drops therethrough, a blower to direct a blast under the riddle and over the hopper, to winnow the grain as it drops from the riddle, and a shield rising from the threshing-machine casing, and forming a passage in which the tailings are discharged from the riddle, said passage being open at its upper end and at its lower end communicating with the opening in the threshing-machine casing, and said shield intercepting the blast from the blower, deflecting the blast upwardly, and directing the tailings downwardly through said passage into the threshing-machine casing, substantially as described.

3. A threshing-machine casing having an opening in its upper side, in combination with a recleaning mechanism and an elevator to convey threshed grain to said recleaning mechanism, the latter including a riddle, a hopper below the riddle, to catch the grain that drops therethrough, a blower to direct a blast under the riddle and over the hopper, to winnow the grain as it drops from the riddle, and a shield rising from the threshing-machine casing, and forming a passage in which the tailings are discharged from the riddle, said passage being open at its upper end and at the lower end communicating with the opening in the threshing-machine casing, and said shield intercepting the blast from the blower, deflecting the blast upwardly, and directing the tailings downwardly through said passage into the threshing-machine casing, the latter having a deflector at the lower end of said passage within said casing to prevent an updraft through said passage, substantially as described.

4. A threshing-machine casing having an opening in its upper side, in combination with a recleaning mechanism and an elevator to convey threshed grain to said recleaning mechanism, the latter including a riddle, a hopper below the riddle, to catch the grain that drops therethrough, a blower to direct a blast under the riddle and over the hopper, to winnow the grain as it drops from the riddle, and a shield hinged at its lower end to and adapted to be disposed in a vertical position on the threshing-machine, to form a passage in which the tailings are discharged from the riddle, said passage being open at its upper end and at its lower end communicating with the opening in the threshing-machine casing, and said shield intercepting the blast from the blower, and deflecting the blast upwardly and directing the tailings downwardly through said passage into the threshing-machine casing, substantially as described.

In testimony that we claim the foregoing as our own we have hereto affixed our signatures in the presence of two witnesses.

ADOLPHIS D. FRANCOEUR.
GEORGE L. FRANCOEUR.

Witnesses:
ISA FRANKFORTHER,
W. C. WHIPP.